(12) United States Patent
Andersen et al.

(10) Patent No.: US 8,498,434 B2
(45) Date of Patent: Jul. 30, 2013

(54) FSK RECEIVER FOR A HEARING AID AND A METHOD FOR PROCESSING AN FSK SIGNAL

(75) Inventors: Henning Haugaard Andersen, Birkerod (DK); Soren Kilsgaard, Smorum (DK)

(73) Assignee: Widex A/S, Lynge (DK)

( * ) Notice: Subject to any disclaimer, the term of this patent is extended or adjusted under 35 U.S.C. 154(b) by 563 days.

(21) Appl. No.: 12/777,652

(22) Filed: May 11, 2010

(65) Prior Publication Data

US 2010/0220878 A1    Sep. 2, 2010

Related U.S. Application Data

(63) Continuation-in-part of application No. PCT/DK2007/000493, filed on Nov. 12, 2007.

(51) Int. Cl.
*H04R 25/00* (2006.01)
(52) U.S. Cl.
USPC .......................................................... 381/312
(58) Field of Classification Search
USPC .......................................................... 381/312
See application file for complete search history.

(56) References Cited

U.S. PATENT DOCUMENTS

| | | | | |
|---|---|---|---|---|
| 4,529,941 A * | 7/1985 | Lipoff | ......................... | 329/303 |
| 4,987,374 A | 1/1991 | Burke | | |
| 7,236,212 B2 * | 6/2007 | Carr et al. | ..................... | 348/726 |
| 7,286,615 B2 * | 10/2007 | Mizuno | ......................... | 375/334 |

OTHER PUBLICATIONS

Notification of Transmittal of the International Preliminary Report on Patentability mailed Oct. 26, 2009 for PCT/DK2007/000493.

\* cited by examiner

*Primary Examiner* — Jianchun Qin
(74) *Attorney, Agent, or Firm* — Sughrue Mion, PLLC

(57) ABSTRACT

A hearing aid comprises a wireless Frequency-Shift-Keying (FSK) receiver. The receiver has an antenna receiving an FSK signal, a first amplifier stage amplifying the FSK signal, a limiter stage limiting the amplified FSK signal, a plurality of parallel phase detection stages and a lookup table block. Each phase detection stage comprises a local oscillator, a mixer stage, a filter stage, and a comparator stage. The output of each of the respective comparator stages is provided to the input of the look-up table block. The invention also relates to a method for processing a wireless FSK signal for providing a signal for a hearing aid, and a wireless FSK receiver.

12 Claims, 7 Drawing Sheets

FSK RECEIVER FOR A HEARING AID AND A METHOD FOR PROCESSING AN FSK SIGNAL

RELATED APPLICATIONS

The present application is a continuation-in-part of application No. PCT/DK2007000493, filed on Nov. 12, 2007, in Denmark and published as WO 2009062500 A1.

BACKGROUND OF THE INVENTION

1. Field of the Invention

This application relates to hearing aids. More specifically, it relates to hearing aids comprising wireless receivers. Still more specifically the invention relates to hearing aids comprising frequency-shift-keying (FSK) receivers.

2. Prior Art

A common signal source in a hearing aid is one or more microphones picking up acoustic sound signals occurring in the vicinity of the hearing aid. Another common signal source in hearing aids is a telecoil receiver. Such a receiver is usually embodied as a tiny coil configured to pick up electromagnetic base band (i.e. unmodulated) audio frequency signals from a telecoil transmitter surrounding the hearing aid comprising the receiver.

State-of-the-art hearing aids are usually designed to accept more than one signal source for advanced functionalities for the purpose of amplifying, conditioning and reproducing them by virtue of the hearing aid circuitry.

Some behind-the-ear (BTE) hearing aids have means for connecting external equipment to the hearing aid circuitry, such as FM-receivers, Bluetooth® receivers, cables etc. Such external equipment enables communication with the hearing aid in various ways. Thus e.g. a cable connection may be provided for the purpose of programming the hearing aid, an FM-receiver may be connected for use in public address situations where a speaker is wearing a microphone with a wireless FM transmitter, and a Bluetooth® receiver may be used for streaming audio signals from a mobile telephone or the like.

Some newer hearing aid types also comprise internal wireless receivers. Most of these wireless receiver types draw their power directly from the hearing aid battery. Prolonged use of wireless receivers known in the art may lead to rapid depletion of the hearing aid battery necessitating frequent battery changes and adding to the cost of operation of the hearing aid. Receiver types having integral power supplies comprising a separate battery add to the weight, size and complexity of the receiver. A more power-efficient wireless receiver would thus be of great benefit to hearing aid users.

Power-efficiency may, e.g., be enhanced by reducing the total power consumption of the receiver circuitry. However, this should be performed without impairing the noise performance of the receiver, which would lead to reduced signal quality. Provided that signals to be transmitted are in a digital format, an FSK transmitter-receiver configuration, well-known to persons skilled in the art, is generally preferred.

FSK signals may be demodulated in several different ways, each having different advantages, topologies and complexity. The demodulators can be subdivided into several categories: FM to AM demodulator types (e.g. Slope, Foster-Seeley and Ratio), PLL demodulators, Zero-crossing demodulators and Quadrature demodulators.

One quadrature demodulator type well known in the art comprises a local oscillator and two signal branches denoted the in-phase branch and the quadrature branch, respectively, the received signal being splitted into an in-phase (I) component and a quadrature (Q) component. In the (binary) quadrature signal, one component is assigned binary zero, and the other component is assigned binary one. As the two signal components I and Q are mutually exclusive, a digital bit-stream consisting of ones and zeroes is generated whenever the transmitter is active. Both branches are connected to a CPU, which completes the demodulation process. Generally, each branch comprises a multiplier, a filter and a decision device. The multiplier in the in-phase branch is connected directly to the local oscillator, whereas the multiplier in the quadrature branch is connected to a 90° phase-shifted version of the local oscillator. The information in the frequency-shift-keyed signal is then decoded and utilized according to its intended purpose.

Such an FSK demodulator is, for instance, described in U.S. Pat. No. 4,987,374, in the name of Burke. This demodulator comprises a local oscillator feeding a first and a second branch, each branch comprising a mixer and a detection stage. The mixer in the first branch mixes the incoming signal with the direct signal from the local oscillator, and the mixer in the second branch mixes the incoming signal with a 90° phase-shifted version of the signal from the local oscillator.

FSK receivers according to the prior art work satisfactorily in a multitude of applications. However, if the available power is only small, as is the case in hearing aids, the effective transmission range is very short, and reception errors, e.g. due to noise present in the signal, may severely corrupt the quality of the received signal.

More confident means of detecting the signals for the purpose of improving the noise-immunity of an FSK receiver without a significant increase in power consumption is thus desired.

SUMMARY OF THE INVENTION

The invention, in a first aspect, provides a wireless FSK receiver for use in a hearing aid, said receiver comprising a first amplifier stage, a limiter stage, a plurality of phase detection stages, the number of phase detection stages being greater than two, and a lookup table, said first amplifier stage being connected to the input of said a limiter stage, the output of said limiter stage being split up into a first plurality of respective inputs said plurality of phase detection stages, each phase detection stage comprising a local oscillator, a mixer stage, a filter stage, and a comparator stage, respectively, the input of each phase detection stage forming a first input of the respective mixer stage, each of the respective local oscillators being connected to a second input of the respective mixer stage, the output of each mixer stage being connected to an input of the respective filter stage, the output of each of the filter stages being connected to an input of the respective comparator stage, the output of each of the comparator stages being connected to an input of said look-up table, the output of said lookup table forming an Arc tan 2-value from a set of arguments produced by said plurality of phase detection stages, wherein the frequency of each of the local oscillators is tuned to the carrier frequency of an FSK signal and wherein the phase angles of the local oscillators of the phase detection stages are mutually staggered by 180°/n, where n is the number of local oscillators.

By increasing the number of demodulator branches from two to three, four, five, or more branches, the total bit-resolution, i.e. the number of discrete symbols sent per data bit, of the FSK receiver according to the invention is comparatively increased. Utilizing state of the art microelectronic technology, the increased power consumption resulting from the addition of more demodulator branches has been found to be acceptable in spite of the added complexity of the receiver. A more effective, yet power-efficient approach to FSK receiver design is thus achieved. Wireless FSK receivers comprising from five to ten demodulator branches are considered to provide the most optimum balance between noise-immunity, circuit complexity, and total receiver power consumption.

The invention, in a second aspect, provides a wireless FSK receiver and a method for processing a wireless FSK signal for providing a signal for a hearing aid, including the steps of receiving said FSK signal, amplifying said FSK signal, limiting the amplified FSK signal, splitting the amplified, limited FSK signal into a plurality of signal branches, the number of branches being greater than the number of distinctly detectable phase angles to be received, detecting the phase of the FSK signal in each branch of the plurality of signal branches, calculating a logical signal vector based on the detected phase of the FSK signal in each of the plurality of signal branches, summing the signal vectors of the plurality of signal branches, deriving information from the FSK signal based on the result of the summation, and presenting the derived information to the hearing aid, wherein the step of detecting the phase of the FSK signal in each branch of the plurality of signal branches includes the steps of creating a mixed signal by mixing the FSK signal with the signal from a local oscillator, band-limiting the mixed signal using a low-pass filter, comparing the mixed, band-limited signal to a fixed, predetermined level, and generating a logical value based on the comparison.

The invention, in a third aspect, provides a hearing aid comprising a wireless frequency-shift-keying (FSK) receiver, said receiver comprising an antenna, a first amplifier stage, a limiter stage, a plurality of parallel phase detection stages and a lookup table block, wherein each phase detection stage comprises a local oscillator, a mixer stage, a filter stage, and a comparator stage, respectively, the outputs of each of the respective comparator stages being connected to the input of the look-up table block, characterized in that the number of phase detection stages is greater than two.

Further features and advantages appear from the dependent claims.

BRIEF DESCRIPTION OF THE DRAWINGS

The invention will now be described in further detail with respect to the drawings, where.

DETAILED DESCRIPTION OF THE INVENTION

Figure 1:
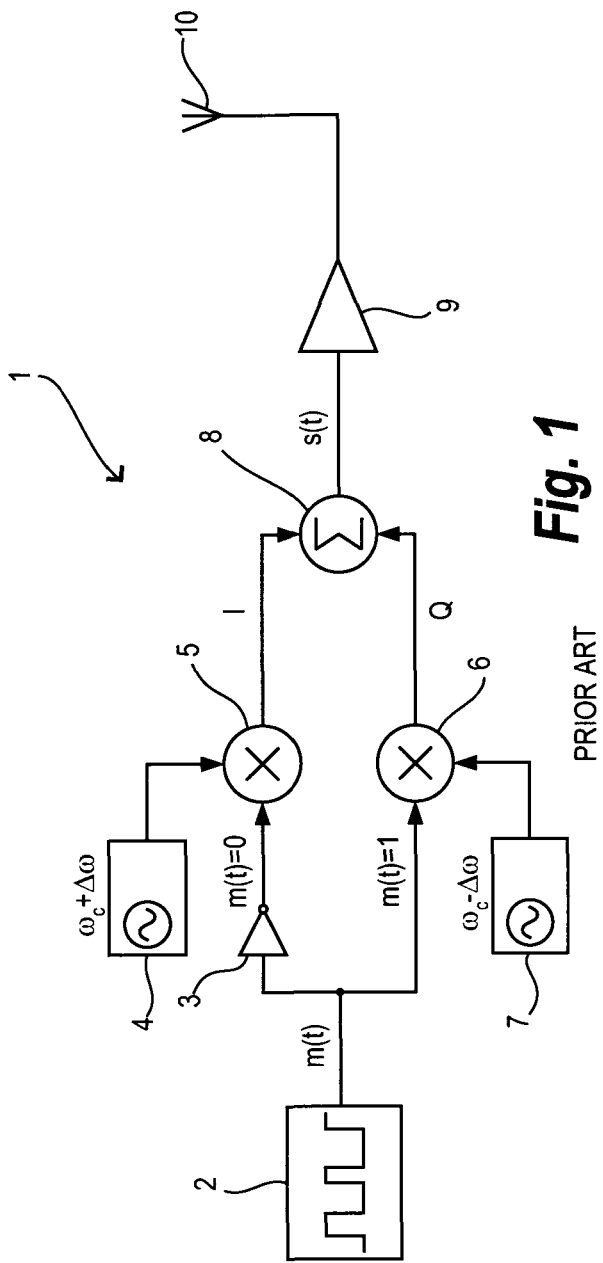
FIG. 1 is a block schematic showing a prior art wireless FSK transmitter.

A Frequency-shift-keying (FSK) transmitter 1 according to the prior art is shown in FIG. 1. It comprises a serial bit stream generator 2, an inverter 3, a first mixer or multiplier 5, a first local oscillator 4, a second mixer or multiplier 6, a second local oscillator 7, a summing node 8, an output stage 9, and a transmitter antenna 10. A data signal m(t) is generated by the serial bit stream generator 2 and split into two branches. The signal in the lower branch is mixed with the signal from the second local oscillator 7 in the second mixer 6, and the signal in the upper branch is inverted by the inverter 3 and mixed with the signal from the first local oscillator 4 in the first mixer 5. Due to the presence of the inverter 3 in the upper branch, only one of the mixers 5, 6 produce an output signal at any time.

The signals from the local oscillators 4, 7 may be described as:

$$\cos((\omega_c+\Delta\omega)\cdot t)$$

and $$\cos((\omega_c-\Delta\omega)\cdot t)$$

respectively. The signals from the two output branches of the modulator 1 are summed in the summing node 8, resulting in the FSK signal s(t), described as $$s(t)=\overline{m}(t)\cos((\omega_c+\Delta\omega)\cdot t)+m(t)\cos((\omega_c-\Delta\omega)\cdot t)$$

which is amplified by the output stage 9 for wireless transmission via the transmitter antenna 10. The FSK transmitter thus outputs one of two frequencies, determined by the local oscillators 4 and 7, depending on whether m(t) is "0" or "1".

Figure 2:
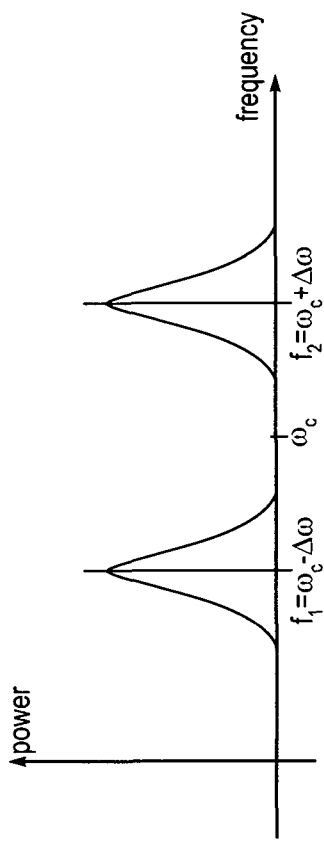
FIG. 2 is a graph showing a spectrum of the signal transmitted by the transmitter in FIG. 1.

FIG. 2 shows part of a frequency spectrum of an FSK signal generated by the FSK transmitter in FIG. 1. The signals are located around $f_c+\Delta f$ and $f_c-\Delta f$. Spectral content will be different with different modulation index values and different spectral content of m(t).

Figure 3:
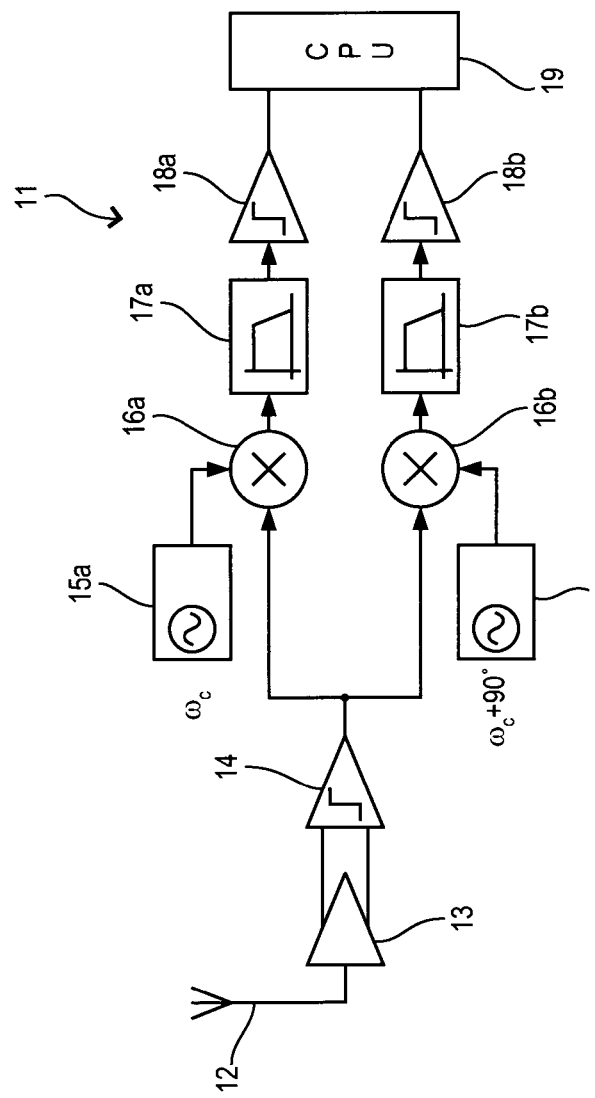
FIG. 3 is a prior art wireless FSK receiver.

A prior art wireless FSK receiver 11, configured to receive and decode wireless FSK signals generated by the FSK transmitter in FIG. 1, is shown in the block schematic in FIG. 3. An input stage of the wireless FSK receiver 11 comprises a receiving antenna 12, an amplifier 13, and a limiter 14. For detection of the received signals the FSK receiver 11 also has a first phase detection stage comprising a first local oscillator 15a, a first mixer 16a, a first low-pass filter 17a, a first limiter 18a, a second phase detection stage comprising a second local oscillator 15b, a second mixer 16b, a second low-pass filter 17b, a second limiter 18b, and a CPU interface 19.

An FSK signal is picked up by the receiving antenna 12 and amplified by the amplifier 13 and conditioned by the limiter 14. The output of the limiter 14 is split into two branches and fed to an input of the first mixer 16a and an input of the second mixer 16b, respectively. In the first mixer 16a, the input signal is multiplied with the output signal from the first local oscillator 15a. The resulting output signals are fed to inputs of the first low-pass filter 17a and the output signals from the first low-pass filter 17a are fed to inputs of the first limiter 18a.

Likewise, in the second mixer 16b, the input signal is multiplied with the output signal from the second local oscillator 15b. The resulting output signals are fed to inputs of the second low-pass filter 17b and the output signals from the second low-pass filter 17b are fed to inputs of the second limiter 18b. The output signals from the first limiter 18a and the second limiter 18b are fed to the input of the CPU interface 19 for further processing.

Figure 4:
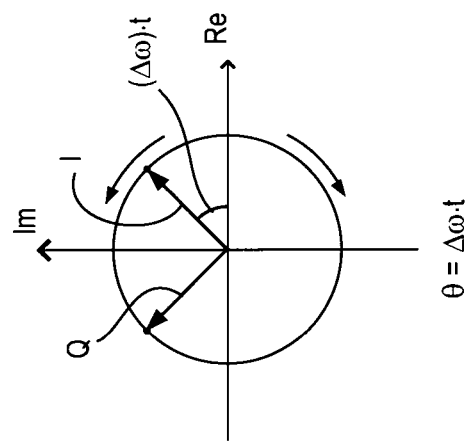
FIG. 4 is a vector diagram of the signals detected by the prior art wireless FSK receiver shown in FIG. 3.

FIG. 4 is a vector diagram showing the vectors I (in-phase) and Q (quadrature-phase) of the signal received by the prior art receiver shown in FIG. 3. The vectors I and Q are depicted on the unit circle and have a mutual phase difference of 90°. The phase deviation between the abscissa (0°) and the vector I is denoted $\Delta \omega \cdot t$ and represents the angular symbol resolution of the prior art receiver 11.

In this setup, where the number of phase detection stages in the receiver is two, equal to the number of distinctly detectable phase angles present in the transmitted signal, noise and EMC interference present in the received signal may reduce the receiving capability of the prior art receiver 11 significantly, eventually to the point where information gets garbled, distorted or lost completely. As the transmitted power decreases, the susceptibility towards noise interference increases. The reception quality may be improved in several ways, for instance by increasing the transmitter power, decreasing the transmission distance, or improving the receiver selectivity.

Increasing the transmitter power may be impossible if compatibility with existing receivers is to be maintained. A more powerful transmitter may also be bulky and difficult to incorporate in e.g. a pocket-sized remote control. In this case, the transmission distance may also be a matter of convenience, as it is beneficial to keep a remote control in a pocket and operate it from there. Improvements in receiver selectivity is very hard to accomplish without increasing the complexity—and thus the power consumption—of the receiver circuitry considerably. Providing an FSK receiver having an improved noise immunity without significantly increasing the power consumption is an object of the present invention.

Figure 5:
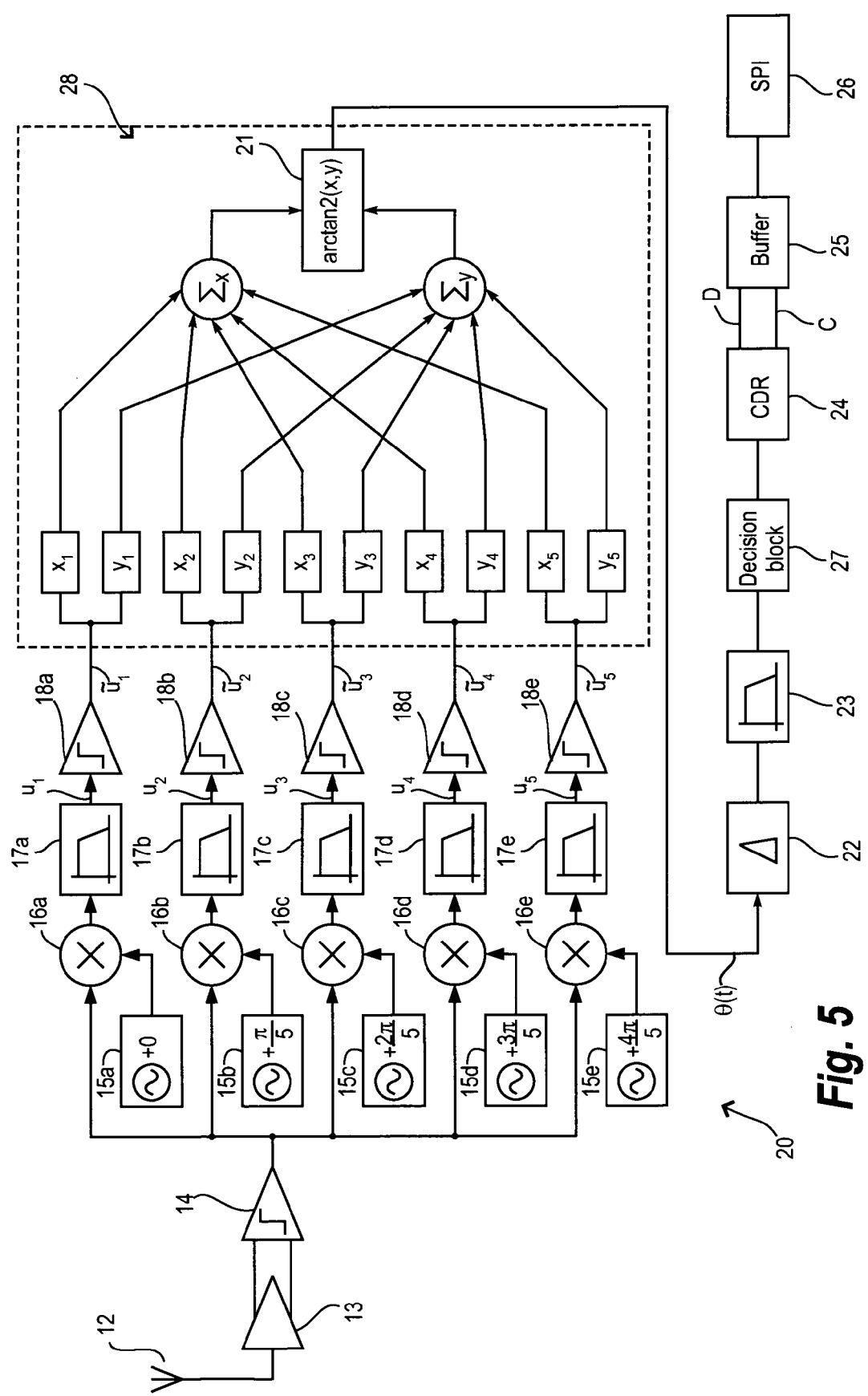
FIG. 5 is a block schematic of an embodiment of a wireless FSK receiver according to the invention.

A block schematic of a wireless FSK receiver 20 according to an embodiment of the invention is shown in FIG. 5. The wireless FSK receiver 20 is a single ended FSK receiver. An input stage of the wireless receiver 20 comprises a receiving antenna 12, an amplifier 13, and a limiter 14, similar to the input stage of the wireless receiver 11 of the prior art. For detection of the received signals, the FSK receiver 20 comprises five identical demodulator branches, each demodulator branch comprising a local oscillator 15a, 15b, 15c, 15d, 15e, a mixer 16a, 16b, 16c, 16d, 16e, a low-pass filter 17a, 17b, 17c, 17d, 17e, and a limiter 18a, 18b, 18c, 18d, 18e, respectively.

The outputs of each of the limiters 18a, 18b, 18c, 18d, 18e, respectively, are connected to inputs of a look-up table block 28 comprising weights $x_1, x_2, x_3, x_4, x_5$, weights $y_1, y_2, y_3, y_4, y_5$, a first summer $\Sigma_x$ and a second summer $\Sigma_y$, and an Arc tan 2-function 21.

Each output of the limiters 18a, 18b, 18c, 18d, 18e of the wireless FSK receiver 20 feeds an input of the look-up table 28, and is split into two separate sets of branches which are weighted with $x_i$ and $y_i$, respectively. The outputs from the weights $x_1, x_2, x_3, x_4$, and $x_5$ are summed in the first summer $\Sigma_x$, and the outputs from the weights $y_1, y_2, y_3, y_4$, and $y_5$ are summed in the second summer $\Sigma_y$. The outputs of the summers $\Sigma_x$ and $\Sigma_y$ are fed to the inputs of the Arc tan 2-function 21, and the output of the Arc tan 2-function 21 of the look-up table 28 is connected to the input of a differentiator 22. The Arc tan 2-function is explained in further detail in the following.

The two-argument arcus tangent function used in this context is a variant of the arcus tangent function Arc tan 2(x,y) and is defined as:

$$\text{Arctan2}(x, y) = \begin{cases} \arctan(\varphi), & x > 0 \\ \pi + \arctan(\varphi), & x < 0 \\ \frac{\pi}{2}, x = 0, & y > 0, \\ -\frac{\pi}{2}, x = 0, & y < 0 \end{cases} \text{ where } \varphi = \frac{y}{x}$$

It is thus defined in the whole unit circle as opposed to the conventional arcus tangent function arc tan (x,y), which is only defined in the right hand side of the unit circle.

The output of the differentiator 22 is connected to the input of a low-pass filter 23, the output of the low-pass filter 23 is connected to the input of a decision block, also referred to as comparator 27, and the output of the comparator 27 is connected to the input of a clock data recovery block 24. The clock data recovery block 24 is connected to a buffer 25 via a clock line C and a data line D. The output of the buffer 25 is connected to the input of a serial peripheral interface 26.

The antenna 12 picks up a transmitted signal and the amplifier 13 amplifies the received signal to a signal level suitable for input to the limiter 14. The received signal is assumed to be a frequency-modulated, frequency-shift-keyed analog bit stream. The received signal is converted into a two-level digital bit stream by virtue of the limiter 14. This signal is then presented to the inputs of the first, second, third, fourth and fifth demodulator branches as described in the following.

The first demodulator branch 15a, 16a, 17a, 18a converts and conditions a first part of the signal output by the limiter 14. The first local oscillator 15a and the first mixer 16a converts the received signal into a baseband signal. The first mixer 16a outputs a direct converted version of the transmitted signal for the first low-pass filter 17a, and the signals from the outputs of the first filter 17a are used as the input signals for the first limiter 18a, acting as a decision device in the first branch 15a, 16a, 17a, and 18a. The output of the first limiter 18a is a logical, digital level, which is used as argument for the weights $x_1$ and $y_1$, summed in the summers $\Sigma_x$ and $\Sigma_y$, to provide the inputs for the Arc tan 2-function 21 of the look-up table 28.

The second demodulator branch 15b, 16b, 17b, 18b converts and conditions a second part of the signal output by the limiter 14. The output signal from the second local oscillator 15b is shifted in phase by $\pi/5$ when compared to the output signal from the first local oscillator 15a. The second local oscillator 15b and the second mixer 16b converts the received signal into a baseband signal. The second mixer 16b outputs a direct converted version of the transmitted signal for the second low-pass filter 17b, and the signals from the outputs of the second filter 17b are used as the input signals for the second limiter 18b, acting as a decision device in the second branch 15b, 16b, 17b, and 18b. The output of the second limiter 18b is a logical, digital level, which is used as argument for the weights $x_2$ and $y_2$, summed in the summers $\Sigma_x$ and $\Sigma_y$, to provide the inputs for the Arc tan 2-function 21 of the look-up table 28.

The third demodulator branch 15c, 16c, 17c, 18c converts and conditions a third part of the signal output by the limiter 14. The output signal from the third local oscillator 15c is shifted in phase by 2π/5 when compared to the output signal from the first local oscillator 15a. The third local oscillator 15c and the third mixer 16c converts the received signal into a baseband signal. The third mixer 16c outputs a direct converted version of the transmitted signal for the third low-pass filter 17c, and the signals from the outputs of the third filter 17c are used as the input signals for the third limiter 18c, acting as a decision device in the third branch 15c, 16c, 17c, and 18c. The output of the third limiter 18c is a logical, digital level, which is used as argument for the weights $x_3$ and $y_3$, summed in the summers $\Sigma_x$ and $\Sigma_y$, to provide the inputs for the Arc tan 2-function 21 of the look-up table 28.

The fourth demodulator branch 15d, 16d, 17d, 18d converts and conditions a fourth part of the signal output by the limiter 14. The output signal from the fourth local oscillator 15d is shifted in phase by 3π/5 when compared to the output signal from the first local oscillator 15a. The fourth local oscillator 15d and the fourth mixer 16d converts the received signal into a baseband signal. The fourth mixer 16d outputs a direct converted version of the transmitted signal for the fourth low-pass filter 17d, and the signals from the outputs of the fourth filter 17d are used as the input signals for the fourth limiter 18d, acting as a decision device in the fourth branch 15d, 16d, 17d, and 18d. The output of the fourth limiter 18d is a logical, digital level, which is used as argument for the weights $x_4$ and $y_4$, summed in the summers $\Sigma_x$ and $\Sigma_y$, to provide the inputs for the Arc tan 2-function 21 of the look-up table 28.

The fifth demodulator branch 15e, 16e, 17e, 18e converts and conditions a fifth part of the signal output by the limiter 14. The output signal from the fifth local oscillator 15e is shifted in phase by 4π/5 when compared to the output signal from the first local oscillator 15a. The fifth local oscillator 15e and the fifth mixer 16e converts the received signal into a baseband signal. The fifth mixer 16d outputs a direct converted version of the transmitted signal for the fifth low-pass filter 17d, and the signals from the outputs of the fifth filter 17d are used as the input signals for the fifth limiter 18e, acting as a decision device in the fifth branch 15e, 16e, 17e, and 18e. The output of the fifth limiter 18e is a logical, digital level, which is used as argument for the weights $x_5$ and $y_5$, summed in the summers $\Sigma_x$ and $\Sigma_y$, to provide the inputs for the Arc tan 2-function 21 of the look-up table 28.

The Arc tan 2-function 21 thus receives the summed, logical levels $x_i$ and $y_i$ from the five demodulator branches and uses the levels as arguments to the Arc tan 2-function 21. The Arc tan $2(x_i, y_i)$ function 21 thus derives the rotational vector θ(t), which is used as the input for the differentiator 22. The output signal from the differentiator 22 is low-pass filtered in the low-pass filter 23, and the output signal from the low-pass filter 23 is passed to the comparator 27, which acts as a decision device for the demodulator. The output from the comparator 27 is used as input to the clock data recovery block 24.

The clock data recovery block 24 extracts embedded clock pulses from the serial data signal presented to it by the low-pass filter 23, and presents the recovered clock pulses to the buffer 25 through the clock line C, and the serial data signals through the data line D. The embedded clock pulses are used by the serial parallel interface to resynchronize the buffered data signals. The buffer 25 collects a predetermined number of received data bits, and presents the data bits to the serial peripheral interface 26. The serial peripheral interface 26 is configured to fetch the buffered data before the buffer 25 is full.

The wireless receiver 20 is capable of detecting the phase difference between individual digital symbols in the received data stream with greater accuracy than FSK receivers known in the prior art. Assuming that each of the five local oscillators 15a, 15b, 15c, 15d, 15e, outputs a signal $LO_i(t)$ given as:

$$LO_i(t) = \cos\left(\omega_c \cdot t + \frac{i \cdot \pi}{5}\right)$$

then the demodulated signal $u_i(t)$ for each branch i in the FSK receiver 20 according to the invention may be described as:

$$u_i(t) = K \cdot \left(\overline{m}(t) \cdot \cos\left(\Delta\omega \cdot t - \frac{i \cdot \pi}{5}\right) + m(t) \cdot \cos\left(-\Delta\omega \cdot t - \frac{i \cdot \pi}{5}\right)\right)$$

where K is a constant of proportionality. This expression does not take the sidebands generated by clipping in the limiter 14 into account.

Figure 7:
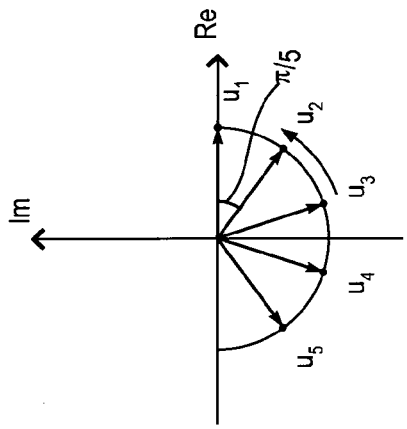
FIG. 7 is a vector diagram of the signals detecting a binary "0" from the wireless FSK receiver shown in FIG. 5.
Figure 6:
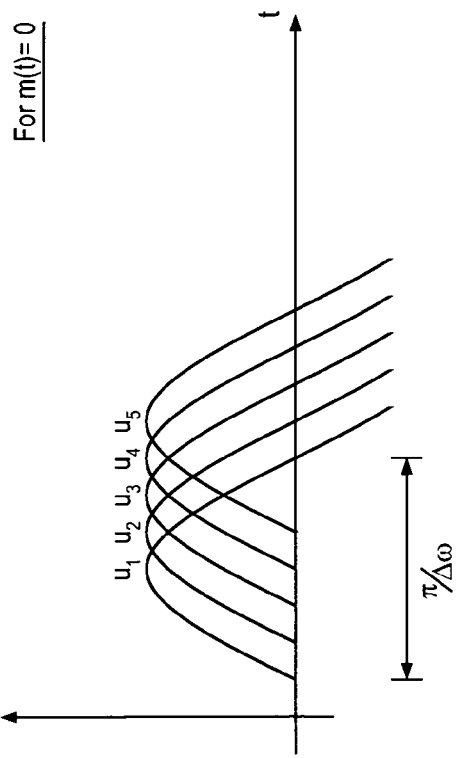
FIG. 6 is a timing diagram of the five branches detecting a binary "0" prior to the clipping stage in the wireless FSK receiver shown in FIG. 5.

The graph in FIG. 6 shows the five curves $u_1$, $u_2$, $u_3$, $u_4$, and $u_5$ for reception instances where m(t)=0. The half-period of each curve $u_i$ corresponds to the time period π/Δω, and the order of the curves corresponds to the counterclockwise sequence of the five vectors $u_1$, $u_2$, $u_3$, $u_4$, and $u_5$ representing the five detected signals in the vector graph shown in FIG. 7. The phase deviation is π/5 and represents the angular symbol resolution of the receiver 20 according to the invention. By comparing the vector diagram in FIG. 7 to the vector diagram shown in FIG. 4 it should be noted that the symbol resolution is finer than that obtained by the FSK receiver 11 of the prior art.

Figure 9:
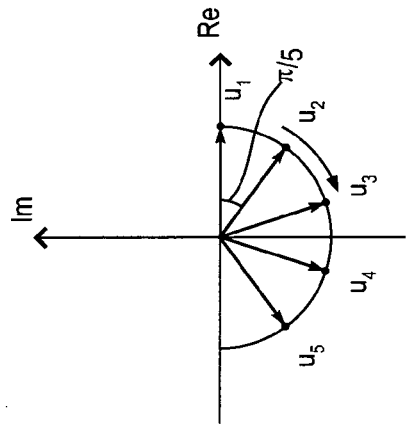
FIG. 9 is a vector diagram of the signals detecting a binary "1" from the wireless FSK receiver shown in FIG. 5.
Figure 8:
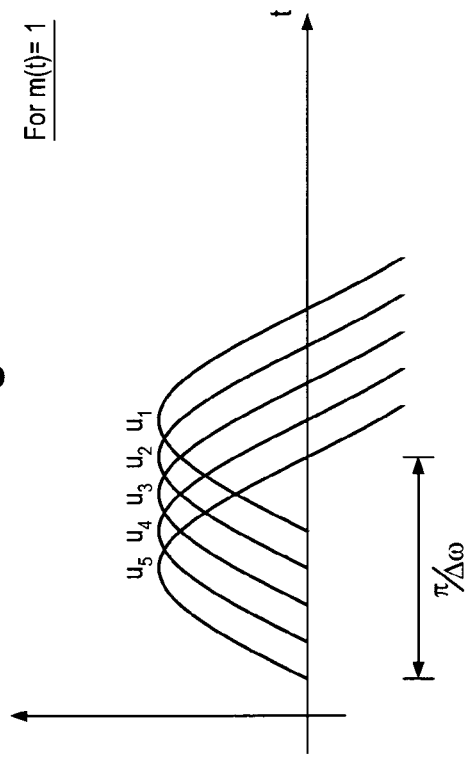
FIG. 8 is a timing diagram of the five branches detecting a binary "1" prior to the clipping stage in the wireless FSK receiver shown in FIG. 5.

The graph in FIG. 8 shows the five curves $u_5$, $u_4$, $u_3$, $u_2$, and $u_1$ for reception instances where m(t)=1. The half-period of each curve $u_i$ corresponds to the time period π/Δω, and the order of the curves correspond to the clockwise sequence of the five vectors $u_5$, $u_4$, $u_3$, $u_2$, and $u_1$ representing the five detected signals in the vector graph shown in FIG. 9. Again, it should be noted that the symbol resolution is finer than that obtained by the FSK receiver 11 of the prior art.

Thus, a progressive sequence of the five detected vectors in the five branches corresponds to a detected, logical '0', and a regressive sequence of the five detected vectors in the five branches corresponds to a detected, logical '1'. This corresponds to a counterclockwise rotation as shown in the vector graph in FIG. 7 when a '0' is detected and a clockwise rotation as shown in the vector graph in FIG. 9 when a '1' is detected.

Figure 10:
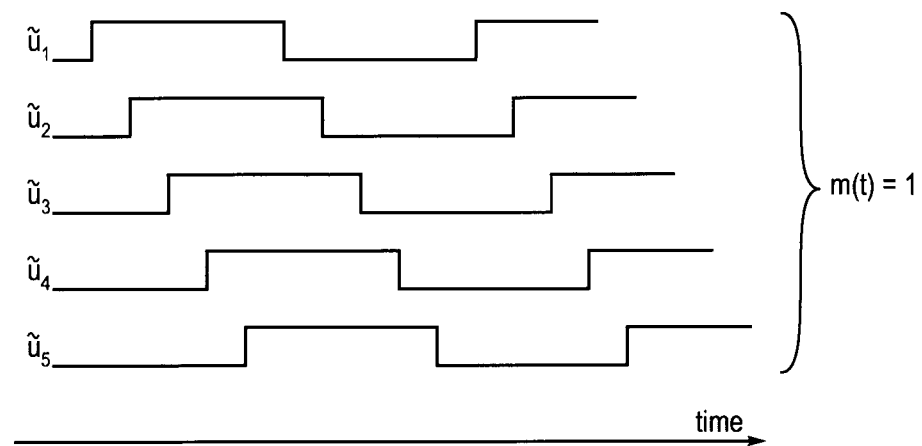
FIG. 10 is a timing diagram of the five branches detecting a binary "0" posterior to the clipping stage in the wireless FSK receiver shown in FIG. 5.
Figure 11:
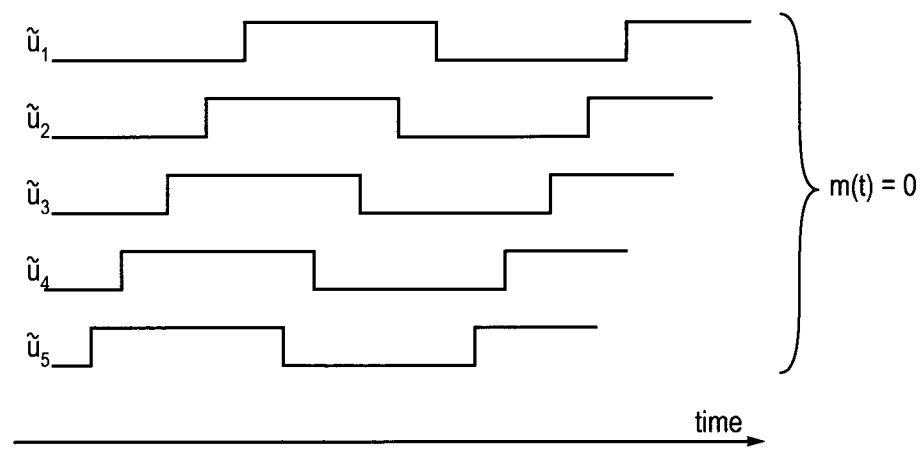
FIG. 11 is a timing diagram of the five branches detecting a binary "1" posterior to the clipping stage in the wireless FSK receiver shown in FIG. 5.

Referring once again to FIG. 5, posterior to the clipping performed by the limiter stages 18a, 18b, 18c, 18d, 18e, of the FSK receiver 20, the five output signals $\tilde{u}_1$, $\tilde{u}_2$, $\tilde{u}_3$, $\tilde{u}_4$, $\tilde{u}_5$, look roughly like the timing diagram in FIG. 10, for m(t)=1, and like the timing diagram in FIG. 11 for m(t)=0. In the case in FIG. 10, $\tilde{u}_1$ is detected first, followed by $\tilde{u}_2$, $\tilde{u}_3$, $\tilde{u}_4$, and $\tilde{u}_5$. This tells the receiver that the signal vector θ(t) is moving clockwise, and that a '1' is received. In the case in FIG. 11, $\tilde{u}_5$ is detected first, followed by $\tilde{u}_4$, $\tilde{u}_3$, $\tilde{u}_2$, and $\tilde{u}_1$. This tells the receiver that the signal vector θ(t) is moving counterclockwise, and that a '0' is received. The deduction of this information for m(t)=1, is, by way of example, described in greater detail in the following.

The signals $\tilde{u}_i$, $y_i$, $x_i$ and the function Arc tan $2(y_i, x_i)$ are used to determine whether the rotation of the vector is clockwise, interpreted as a '1', or counterclockwise, interpreted as a '0'. For m(t)=1, the signals $\tilde{u}_i$ may be described by the matrix A:

$$A = \begin{bmatrix} \tilde{u}_1 & \tilde{u}_2 & \tilde{u}_3 & \tilde{u}_4 & \tilde{u}_5 \\ 1 & 1 & 1 & 1 & 1 \\ -1 & 1 & 1 & 1 & 1 \\ -1 & -1 & 1 & 1 & 1 \\ -1 & -1 & -1 & 1 & 1 \\ -1 & -1 & -1 & -1 & 1 \\ -1 & -1 & -1 & -1 & -1 \\ 1 & -1 & -1 & -1 & -1 \\ 1 & 1 & -1 & -1 & -1 \\ 1 & 1 & 1 & -1 & -1 \\ 1 & 1 & 1 & 1 & -1 \end{bmatrix} \text{ for } m(t)=1$$

The constants $y_i$ and $x_i$ are solutions to the following systems of linear equations:

$$A \cdot y = \begin{bmatrix} \sin 18° \\ -\sin 18° \\ -\sin 54° \\ -1 \\ -\sin 54° \\ -\sin 18° \\ \sin 18° \\ \sin 54° \\ 1 \\ \sin 54° \end{bmatrix}, A \cdot x = \begin{bmatrix} \cos 18° \\ \cos 18° \\ \cos 54° \\ 0 \\ -\cos 54° \\ -\cos 18° \\ -\cos 18° \\ -\cos 54° \\ 0 \\ \cos 54° \end{bmatrix}, \text{ with the angles } \begin{matrix} 18° \\ -18° \\ -54° \\ -90° \\ -126° \\ -162° \\ 162° \\ 126° \\ 90° \\ 54° \end{matrix}$$

where $\phi(t) = \text{Arc tan } 2(A \cdot y, A \cdot x)$, where Arc tan $2(y, x) \in [-\pi, \pi]$ The angle values in the linear equations are here indicated in degrees for clarity. A similar matrix (not shown) describes the signals $\tilde{u}_i$ for m(t)=0. It may also be formally shown that one unique solution exists for y and x, respectively.

Both y and x may be scaled using the same constant as they both are arguments to Arc tan $2(y_i, x_i)$. One particular solution to the linear equations may be:

$$y^T = \begin{bmatrix} 1 & \cos\left(\frac{\pi}{5}\right) & \cos\left(\frac{2\pi}{5}\right) & -\cos\left(\frac{2\pi}{5}\right) & -\cos\left(\frac{\pi}{5}\right) \end{bmatrix}$$

$$x^T = \begin{bmatrix} 0 & \sin\left(\frac{\pi}{5}\right) & \sin\left(\frac{2\pi}{5}\right) & \sin\left(\frac{2\pi}{5}\right) & \sin\left(\frac{\pi}{5}\right) \end{bmatrix}$$

which gives, as a result, the following angular sequences:

$\phi(t) \in \{18°, -18°, -54°, -90°, -126°, -162°, 162°, 126°, 90°, 54°\}$ for m(t)=1 and $\phi(t) \in \{54°, 90°, 126°, 162°, -162°, -126°, -90°, -54°, -18°, 18°\}$ for m(t)=0.

The signal presented to the FSK receiver has either a positive or a negative slope, a positive slope corresponding to a clockwise rotation in the unit circle diagram and thus representing a binary '1', and a negative slope corresponding to a counterclockwise rotation in the unit circle diagram and thus representing a binary '0'. In this way it is possible for the FSK receiver 20 to determine whether the signal is rising or falling, i.e. the vector is moving clockwise or counterclockwise in the unit circle diagram, e.g. by taking the difference between two values of $\phi(t)$ during one bit duration, determine if $\phi(t)$ goes positive or negative within that bit duration period and thus decide if the transmitted symbol is a binary '0' or a binary '1'.

The modulation index is defined as:

$$\beta = \frac{2\Delta f}{DR},$$

where $\Delta f$ is the deviation frequency [Hz], and DR is the data-rate [bits/s]

If the resulting vector rotates with the angular velocity $\Delta \omega$:

$\Delta \omega = 2\pi \Delta f$, then the instantaneous angle value $\phi(t)$ is:

$\phi(t) = \Delta \omega t = 2\pi \Delta f t$.

As an example, suppose that the modulation index $\beta = 1$, then the data rate DR is $2\Delta f$, and the bit duration thus:

$$\frac{1}{DR} = \frac{1}{2\Delta f} = \frac{T_0}{2},$$

where $T_0$ is the period of the deviation frequency of the modulated signal. This implies that the resulting vector rotates $\pi$ radians in the unit circle pr. bit.

In an FSK receiver with more than two branches the concept of bit resolution is defined as:

$$\text{bit resolution} = 2N \frac{\Delta f}{DR} = N\beta,$$

where N is the number of branches in the system. Mathematically, the bit resolution represents the number of points in the unit circle per data bit. As the number of branches is increased, the bit resolution is increased proportionally as the number of detectable symbols representing each bit is increased, and, as a consequence, the detection of each bit is improved. In a pentaphasic system, like the receiver 20 shown in the embodiment in FIG. 5, this gives five distinct angular values for $\phi(t)$ pr. bit, as opposed to just two distinct angular values in the receiver known in the prior art, i.e. a bit resolution of 5·$\beta$ resulting in a higher detection accuracy and thus a better noise immunity.

Figure 12:
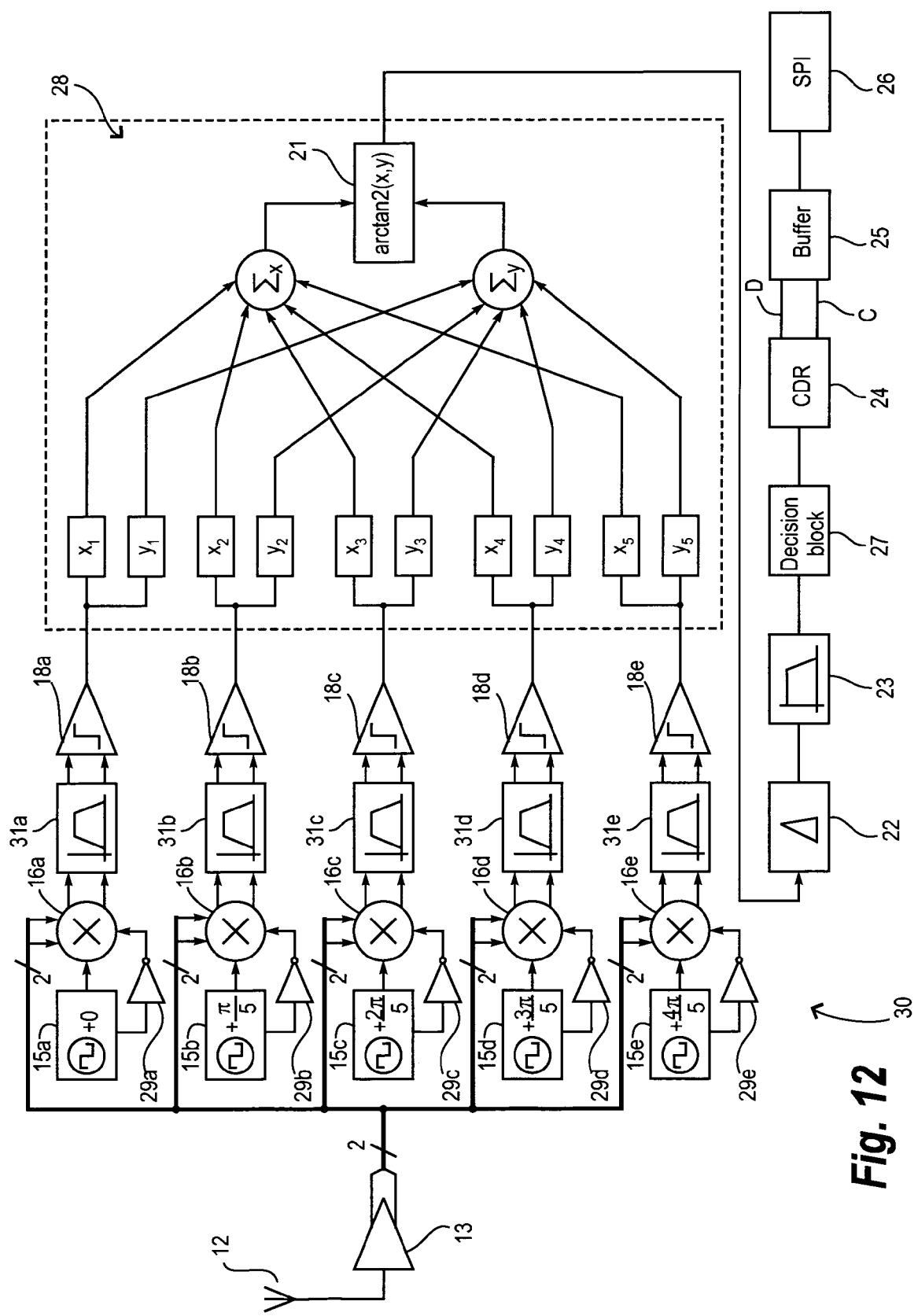
FIG. 12 is an embodiment of a wireless FSK receiver of an analog, differential configuration, according to the invention.

Another preferred embodiment 30 of a wireless FSK receiver according to the invention is shown in FIG. 12. The wireless receiver 30 is a differential FSK receiver. Differential FSK receivers per se are known in the art, and they have several practical advantages over single ended FSK receiver implementations. From an architectural viewpoint, the differential implementation shows no significant differences over the single ended implementation, but in practice, the differential implementation has a better noise immunity.

The differential FSK receiver embodiment of the invention shown in FIG. 12 is described in greater detail in the following.

An input stage of the wireless receiver 30 comprises a receiving antenna 12 and an amplifier 13. An input limiter is not necessary in this implementation. The amplifier 13 is connected via a two-wire interface bus to two inputs of each of five mixers 16a, 16b, 16c, 16d, 16e, respectively. Five local square-wave oscillators 15a, 15b, 15c, 15d, 15e, each comprise two outputs, where one output is connected to the input of a respective one among five inverters 29a, 29b, 29c, 29d, 29e, and one output is connected directly to an input of a respective one among the five mixers 16a, 16b, 16c, 16d, 16e. The outputs of the five inverters 29a, 29b, 29c, 29d, 29e are connected to yet another input of the five mixers 16a, 16b, 16c, 16d, 16e, respectively. The signals from the local square-wave oscillators 15a, 15b, 15c, 15d, 15e differ in phase increments of $\pi/5$.

The purpose of the inverters 29a, 29b, 29c, 29d, 29e is to supply the mixers 16a, 16b, 16c, 16d, 16e, respectively, with a 180° phase-inverted version of the direct signal from the local oscillators 15a, 15b, 15c, 15d, 15e, respectively. The five mixers 16a, 16b, 16c, 16d, 16e, each thus receives four separate signals for mixing, a real input signal and a phase-inverted input signal from the input stage 12, 13, a real local oscillator signal from each of the local square-wave oscillators 15a, 15b, 15c, 15d, 15e, respectively, and a phase-inverted local oscillator signal from each of the inverters 29a, 29b, 29c, 29d, 29e, respectively. The output signals from the five mixers 16a, 16b, 16c, 16d, 16e, comprise five signal pairs with a phase difference of 36° between each signal pair for further processing.

The signal pairs from the five mixers 16a, 16b, 16c, 16d, 16e are connected to the inputs of five band-pass filters 31a, 31b, 31c, 31d, 31e, respectively. The outputs of the five band-pass filters 31a, 31b, 31c, 31d, 31e, also forming signal pairs, are connected to the inputs of five limiters 18a, 18b, 18c, 18d, 18e, respectively. The outputs of the five limiters 18a, 18b, 18c, 18d, 18e are connected to the inputs of a look-up table 28 comprising weights $x_1, x_2, x_3, x_4, x_5$, weights $y_1, y_2, y_3, y_4, y_5$, a first summer $\Sigma_x$ and a second summer $\Sigma_y$, and an Arc tan 2-function 21. The look-up table 28 and the downstream subsequent blocks in FIG. 12 are configured in a manner similar to that of the wireless receiver 20 shown in FIG. 5.

Upstream from the five limiters 18a, 18b, 18c, 18d, 18e, the signals are considered to be analog. Downstream from the five limiters 18a, 18b, 18c, 18d, 18e, the signals are considered to be digital. This strategic placement of the five limiters 18a, 18b, 18c, 18d, 18e, posterior to the mixers 16a, 16b, 16c, 16d, 16e, also aids in keeping power consumption low, as digital switching in the base band requires less power than digital switching at high frequencies such as the FSK transmission frequencies.

The first demodulator branch 15a, 29a, 16a, 31a, 18a converts and conditions a first part of the signal output by the preamplifier 13. The first local oscillator 15a converts the received signal to a baseband signal. The first mixer 16a outputs a direct converted version of the transmitted signal for the first band-pass filter 31a, and the signals from the outputs of the first band-pass filter 31a are used as the input signals for the first limiter 18a, acting as a decision device for the first branch 15a, 29a, 16a, 31a, 18a. The output of the first limiter 18a is a logical, digital level, which is used as argument for the branches $x_1$ and $y_1$, summed in the summers $\Sigma_x$ and $\Sigma_y$, to provide the inputs for the Arc tan 2-function 21 of the look-up table 28.

The second demodulator branch 15b, 29b, 16b, 31b, 18b converts and conditions a second part of the signal output by the preamplifier 13. The second local oscillator 15b converts the received signal to a baseband signal. The second local oscillator 15b is shifted in phase by $\pi/5$ when compared to the output signal from the first local oscillator 15a. The second mixer 16b outputs a direct converted version of the transmitted signal for the second band-pass filter 31b, and the signals from the outputs of the second band-pass filter 31b are used as the input signals for the second limiter 18b, acting as a decision device for the second branch 15b, 29b, 16b, 31b, 18b. The output of the second limiter 18b is a logical, digital level which is used as argument for the branches $x_2$ and $y_2$, summed in the summers $\Sigma_x$ and $\Sigma_y$, to provide the inputs for the Arc tan 2-function 21 of the look-up table 28.

The third demodulator branch 15c, 29c, 16c, 31c, 18c converts and conditions a third part of the signal output by the preamplifier 13. The third local oscillator 15c converts the received signal to a baseband signal. The third local oscillator 15c is shifted in phase by $2\pi/5$ when compared to the output signal from the first local oscillator 15a. The third mixer 16c outputs a direct converted version of the transmitted signal for the third band-pass filter 31c, and the signals from the outputs of the third band-pass filter 31c are used as the input signals for the third limiter 18c, acting as a decision device for the third branch 15c, 29c, 16c, 31c, 18c. The output of the third limiter 18c is a logical, digital level which is used as argument for the branches $x_3$ and $y_3$, summed in the summers $\Sigma_x$ and $\Sigma_y$, to provide the inputs for the Arc tan 2-function 21 of the look-up table 28.

The fourth demodulator branch 15d, 29d, 16d, 31d, 18d converts and conditions a fourth part of the signal output by the preamplifier 13. The fourth local oscillator 15d converts the received signal to a baseband signal. The fourth local oscillator 15d is shifted in phase by $3\pi/5$ when compared to the output signal from the first local oscillator 15a. The fourth mixer 16d outputs a direct converted version of the transmitted signal for the fourth band-pass filter 31d, and the signals from the outputs of the fourth band-pass filter 31d are used as the input signals for the fourth limiter 18d, acting as a decision device for the fourth branch 15d, 29d, 16d, 31d, 18d. The output of the fourth limiter 18d is a logical, digital level which is used as argument for the branches $x_4$ and $y_4$, summed in the summers $\Sigma_x$ and $\Sigma_y$, to provide the inputs for the Arc tan 2-function 21 of the look-up table 28.

The fifth demodulator branch 15e, 29e, 16e, 31e, 18e converts and conditions a fifth part of the signal output by the preamplifier 13. The fifth local oscillator 15e converts the received signal to a baseband signal. The fifth local oscillator 15e is shifted in phase by $4\pi/5$ when compared to the output signal from the first local oscillator 15a. The fifth mixer 16e outputs a direct converted version of the transmitted signal for the fifth band-pass filter 31e, and the signals from the outputs of the fifth band-pass filter 31e are used as the input signals for the fifth limiter 18e, acting as a decision device for the fifth branch 15e, 29e, 16e, 31e, 18e. The output of the fifth limiter 18e is a logical, digital level which is used as argument for the branches $x_5$ and $y_5$, summed in the summers $\Sigma_x$ and $\Sigma_y$, to provide the inputs for the Arc tan 2-function 21 of the look-up table 28.

Whenever wireless FSK signals are picked up by the receiving antenna 12 of the differential FSK receiver 30 of the invention, the received signals are amplified by the input amplifier 13 and presented to the five branches as differential analog signals. The differential signals are converted, i.e. folded, down in frequency from the transmission frequency to the base band frequency, in the mixers 16a, 16b, 16c, 16d, 16e, respectively, by the signals from the local square-wave oscillators 15a, 15b, 15c, 15d, 15e, respectively, and the inverted square-wave signals from the inverters 29a, 29b, 29c, 29d, 29e, respectively. The down-converted signals from the mixers 16a, 16b, 16c, 16d, 16e, respectively, are band-limited in the band-pass filters 31a, 31b, 31c, 31d, 31e, respectively, and the band-limited signals from the band-pass filters 31a, 31b, 31c, 31d, 31e, respectively, are limited by the five limiters 18a, 18b, 18c, 18d, 18e, respectively, and thus converted into logical levels presented to the summation points $\Sigma_x$ and $\Sigma_y$, respectively via the weights $x_i$ and $y_i$, respectively.

The summation points $\Sigma_x$ and $\Sigma_y$ present their outputs to the Arc tan 2-function 21 of the look-up table 28. The subsequent blocks, the differentiator 22, the low-pass filter 23, the decision block comparator 27, the clock data recovery block 24, the buffer 25, and the serial peripheral interface 26, have a similar configuration and functionality as in the embodiment shown in FIG. 5.

In addition to the benefits achieved by utilizing a pentaphasic configuration, the embodiment of the wireless FSK receiver 30 shown in FIG. 12 further benefits from the fact that the limiting of the received signal is performed in the base band, i.e. posterior to the conversion stages comprised of the mixers 16a, 16b, 16c, 16d, 16e, respectively. This further reduces the current consumption of the wireless FSK receiver 30, resulting in prolonged battery life, even during prolonged continuous operation of the receiver 30 according to the invention.

Figure 13:
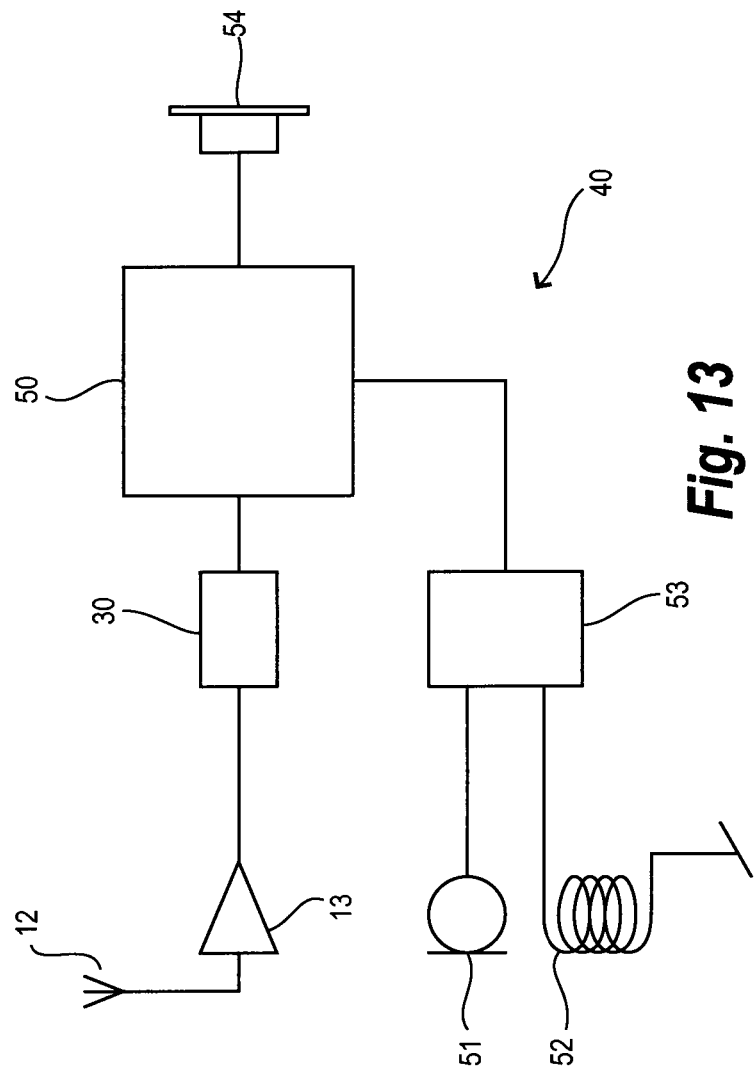
FIG. 13 is a hearing aid with a wireless FSK receiver according to the invention.

FIG. 13 is a block schematic of a hearing aid 40 according to the invention. The hearing aid 40 comprises an antenna 12, an amplifier 13, a wireless FSK receiver 30, a microphone 51, a telecoil 52, an input selector 53, a hearing aid processor 50, and an acoustic output transducer 54. The hearing aid processor 50 is configured to process signals from the microphone 51 and the telecoil 52, and further comprises means (not shown) to process signals received by the wireless FSK receiver 30 for reproduction by the acoustic output transducer 54. The wireless FSK receiver 30 is preferably an integral part of the circuitry of the hearing aid 40, and may even be fully embedded into the integrated circuit comprising the hearing aid processor 50, and may beneficially draw its necessary power from the hearing aid battery (not shown).

The hearing aid according to the invention thus incorporates a low-power, efficient FSK receiver comprising a multiphasic reception scheme. In this way, a hearing aid user may benefit from a multitude of new applications of the hearing aid according to the invention, e.g. wireless remote controlling or programming the hearing aid, or wireless reception of digitally encoded audio signals in the hearing aid.

We claim:

1. A method for processing a wireless frequency-shift-keying (FSK) signal for providing a signal for a hearing aid, including the steps of:
receiving said FSK signal by an antenna,
amplifying said FSK signal in a first amplifier stage,
limiting the amplified FSK signal in a limiter stage,
splitting the amplified, limited FSK signal into a plurality of signal branches, the number of branches being greater than the number of distinctly detectable phase angles to be received,
detecting the phase of the FSK signal in each branch of the plurality of signal branches, wherein the detecting step in each branch includes the steps of:
creating a mixed signal by mixing the FSK signal with the signal from a local oscillator,
band-limiting the mixed signal using a low-pass filter,
comparing the mixed, band-limited signal to a fixed, predetermined level, and
generating a logical value based on the comparison,
calculating a logical signal vector based on the detected phase of the FSK signal in each of the plurality of signal branches,
summing the signal vectors of the plurality of signal branches,
deriving information from the FSK signal based on the result of the summation, and
presenting the derived information to the hearing aid.

2. The method according to claim 1, wherein the phase angle of the local oscillators in the plurality of signal branches are mutually staggered in steps by 180°/n, where n is the number of signal branches.

3. The method according to claim 2, wherein the step of deriving information from the FSK signal includes the steps of determining the signal according to a specific function from the argument of the sum of the logical signal vectors, differentiating the signal from said specific function, low-pass filtering the differentiated signal, recovering the clock and the data from the low-pass filtered signal, storing the recovered data in a buffer based on the restored clock, and retrieving the stored data from the buffer for use by the hearing aid.

4. The method according to claim 3, wherein said specific function is an Arc tan 2-function.

5. The method according to claim 1, wherein the step of detecting the phase of the FSK signal in each branch of the plurality of signal branches includes the steps of splitting the signal into two branches, creating two mixed signals by mixing the split signals with a direct and an inverted signal from a local square-wave oscillator, band-limiting the two mixed signals using a band-pass filter, comparing the mixed, band-limited signals to a fixed, predetermined level, and generating a logical value based on the comparison.

6. The method according to claim 5, wherein the phase angles of the local square-wave oscillators in each branch of the plurality of signal branches are mutually staggered in steps of 180°/n, where n is the number of signal branches.

7. A hearing aid comprising a wireless frequency-shift-keying (FSK) receiver, said receiver comprising
an antenna receiving an FSK signal,
a first amplifier stage amplifying said FSK signal,
a limiter stage limiting said FSK signal,
a phase detection stage having a plurality of parallel signal branches into which the amplified, limited FSK signal is split, the number of branches being greater than the number of distinctly detectable phase angles to be received, wherein each of said branches includes:
a local oscillator providing a local oscillator signal and a mixer for mixing the FSK signal with the local oscillator signal,
a low-pass filter for band-limiting the mixed signal, and
a comparator for comparing the mixed, band-limited signal to a fixed, predetermined level, and for generating a logical value based on the comparison,
a vector generator for generating logical signal vectors from the outputs of each of the respective comparators
a summing unit summing the logical signal vectors, and
means for deriving information from the FSK signal based on the result of the summation, and for presenting the derived information to the hearing aid.

8. The hearing aid according to claim 7, wherein the phase angles of the local oscillators are mutually staggered by 180°/n, where n is the number of local oscillators.

9. The hearing aid according to claim 7, wherein the number of phase detection stages is five.

10. The hearing aid according to claim 7, wherein the outputs of the phase detection stages are fed to inputs of a look-up table block wherein they are combined according to weights.

11. The hearing aid according to claim 7, wherein the phase detection stages are adapted to receive analog inputs, to process the inputs in analog form through the mixer stage and the filter stage, and to digitize the filter outputs in the comparator stages.

12. The hearing aid according to claim 7, wherein each local oscillator has two outputs, where a first output is connected through an inverter to the respective mixer stage and a second output is connected directly to the respective mixer stage.

* * * * *